United States Patent Office 3,578,726

Patented May 11, 1971

3,578,726

CONDENSATION METHOD FOR MAKING MULTIPLE SEQUENCE ORGANOPOLY-SILOXANE BLOCK POLYMERS

Edgar E. Bostick, Scotia, and William A. Fessler, Albany, N.Y., assignors to General Electric Company No Drawing. Filed Oct. 13, 1969, Ser. No. 866,002
Int. Cl. C08g *31/34, 47/02*
U.S. Cl. 260—825 5 Claims

ABSTRACT OF THE DISCLOSURE

A condensation method is provided for making branched and multiple sequence block polymers. A silane having at least two hydrolyzable radicals attached to silicon is employed to couple active polydiorganosiloxane having at least one terminal alkali metal silanolate radical. The polydiorganosiloxane can be in the form of a binary or ternary block and the alkali metal silanolate is complexed with hexamethylphosphoramide to provide a stable non-randomizing activated site. The multiple sequence block polymers exhibit improved physical properties over the corresponding binary or ternary block polymers.

The present invention relates to a method for making multiple sequence block polymers consisting essentially of chemically combined polydiorganosiloxane blocks, such as polydimethylsiloxane and polydiphenylsiloxane, involving the employment of a pre-formed alkali metal silanolate-hexamethylphosphoramide-complex and silane having at least two hydrolyzable radicals attached to silicon.

As shown by Vaughn Pat. 3,328,323, assigned to the same assignee as the present invention, multiple sequence block polymers, such as diorganopolysiloxane block polymers containing polydiarylsiloxane blocks can be made by the intercondensation of silanol terminated polydiorganosiloxane. Although such intercondensation method provides for valuable polydiarylsiloxane polydialkyl siloxane block polymers, the silanol intercondensation often has inherent limitations. Block polymers made by silanol intercondensation, for example, depend upon the use of silanol terminated polydiorganosiloxane. Certain polydiorganosiloxane, such as polydiphenyl siloxane may be difficult to intercondense because of the problem of organic solvent incompatibility above ten or more diphenylsiloxy units.

A method for making ordered diorganopolysiloxane block polymers also is shown by Bostick Pat. 3,337,497 assigned to the same assignee as the present invention. Different cyclopolydiorganosiloxane, such as cyclopolydialkylsiloxane, cyclopolydiarylsiloxane, etc. is employed in a step-wise manner in combination with an organolithium compound. Recurring blocks of different polydiorganosiloxane can be grown to various sizes. Although the problem of solvent incompatibility can be reduced by Bostick's method, practical limitations dictate the number of times different cyclopolydiorganosiloxane can be added to a reaction mixture. In addition, it is difficult to minimize the effect resulting from the build-up of deleterious impurities which can limit the reactivity of the alkali metal initiator.

The present invention is based on the discovery that multiple sequence block polymers, and branched block polymers can be made by employing a silane having at least two hydrolyzable radicals attached to silicon in combination with an active polydiorganosiloxane having terminal alkali metal silanolate radicals derived from the employment of diorganocyclotrisiloxane, and a pre-formed alkali metal silanolate-hexamethylphosporamide-complex, referred to hereinafter as the "silanolate-complex," where "HMPA" is hexamethylphosphoramide.

In accordance with the present invention, there is provided a method which comprises (1) effecting reaction between a diorganocyclotrisiloxane of the formula, (1)
$$\left[ \overset{R}{\underset{R}{-Si}}O- \right]_3$$

and a silanolate-complex of the formula, (2)
$$Y\left[ \overset{R'}{\underset{R'}{-Si}}O- \right]_n M\cdot HMPA$$

where Y is selected from R′ and HMPA·MO—, and (2) effecting reaction between the reaction product of (1) and a different diorganocyclotrisiloxane of the formula, (3)
$$\left[ \overset{R''}{\underset{R''}{-Si}}O- \right]_3$$

to produce active polydiorganosiloxane having at least one alkali metal silanolate-radical and (3) effecting reaction between the polydiorganosiloxane of (2) and a silane of the formula, (4)
$$(R''')_aSiX_{4-a}$$

where R and R″ are selected from the class consisting of monovalent hydrocarbon radicals, halogenated monovalent hydrocarbon radicals and cyanoalkyl radicals, R′ is selected from monovalent hydrocarbon radicals and halogenated monovalent aryl radicals, R‴ is a member selected from hydrogen, monovalent hydrocarbon radicals, halogenated monovalent hydrocarbon radicals, cyanoalkyl radicals, N,N-dialkylaminoalkyl radicals, N,N-diarylaminoalkyl radicals and alkoxyalkyl radicals, M is an alkali metal radical, X is a hydrolyzable radical, "*a*" is a whole number equal to 0 to 2 inclusive, and *n* is an integer having a value of from 1 to 4 inclusive.

Radicals included by R and R″ are, for example, aryl radicals such as phenyl, chlorophenyl, xylyl, tolyl, naphthyl, etc.; aliphatic, haloaliphatic and cycloaliphatic radicals such as alkyl, alkenyl, cycloalkyl, haloalkyl, for exampe, methyl, ethyl, propyl, chlorobutyl, cyclohexyl, etc.; cyanoalkyl radicals such as cyanoethyl, cyanopropyl, cyanobutyl. Radicals included by R′ are all of the aforementioned R and R″ radicals except cyanoalkyl radicals. Radicals included by M of Formula 2 are, for example, sodium, potassium, lithium, rubidium and cesium. Radicals included by X are, for example, siloxy, aryloxy, aminoxy, amino, dialkylamino, acetamido, N-alkylacetamido, halogen, acyloxy, etc. In Formulas 1 and 3 above, R and R″ respectively can be all the same radicals or a mixture of any two or more of the aforementioned R and R″ radicals. Also, in Formulas 2 and 4 respectively, R′ and R‴ can be the same radical or mixture or any two or more of the aforementioned R′ and R‴ radicals.

The cyclodiorganotrisiloxane of Formulas 1 and 3 above are well-known in the art and include, for example, hexamethylcyclotrisiloxane, hexaphenylcyclotrisiloxane, 2,4,6-trimethyl, 2,4,6 - triphenylcyclotrisiloxane, 2,4,6 - trimethyl, 2,4,6 - tri-β-cyanoethylcyclotrisiloxane, 2,4,6-trimethyl-2,4,6-trivinyltrisiloxane, etc.

The silanolate-complexes of Formula 2 and a method for making them are more particularly described in copending application of E. Bostick and J. J. Zdaniewski Ser. No. 866,003, filed concurrently herewith and assigned to the same assignee as the present invention. There are included by the silanolate-complexes the hexamethylphosphoramide-complexes of 1,1,3,3-tetraphenyldisiloxane 1,3-dilithiodiolate, lithium triphenylsilanolate, potassium triphenylsilanolate, etc.

Among the hydrolyzable silanes of Formula 4 there are included, for example, methyldiacetoxysilane, dimethyl, bis(N,N' - diethylaminoxy)silane, dimethyldiacetoxysilane, diphenyldichlorosilane, diphenyldiacetoxysilane, trimethylacetoxysilane, tetraacetoxysilane, dimethyldiaminosilane, etc. Methods for making some of these hydrolyzable silanes are shown by Murphy Pat. 3,441,583, assigned to the same assignee as the present invention, Johannson Pat. 2,429,883, C. Eaborn, organosilicon compounds, Butterworth Scientific Publication, London (1960) page 212, etc.

In accordance with one aspect of the invention, branched polymers can be made, such as:

$$Z'O\underset{\underset{Z''}{O}}{\overset{R'''}{Si}}OZ,\quad Z'''O\underset{\underset{Z''}{O}}{\overset{\overset{Z}{O}}{Si}}OZ',\ \text{etc.}$$

where Z is a polydiorganosiloxane having terminal $$R'\overset{R'}{\underset{R'}{Si}}O$$

units. Z can be in the form of a binary block, AB, ternary block, etc., where A and B are different blocks of polydiorganosiloxane, such as polydialkylsiloxane, polydiarylsiloxane, etc.

The Z, Z' and Z'' radicals in the above branched polymers, can be derived from active intermediate reaction products made by reacting a silanolate-complex of triorgano alkali-metal silanolate included by Formula 2 and diorganocyclotrisiloxane included by Formulas 1 and 3. The addition of the diorganocyclotrisiloxane can be accomplished in a step-wise manner. The active intermediate reaction products can be in the form of AB or ABA segments, having a terminal alkali metal silanolate radical and a chain stopper, $$R'\overset{R'}{\underset{R'}{Si}}O$$

as previously described. When mixed with an appropriate silane, as shown by Formula 4, the active intermediate reaction products produce the above shown branched polymers.

Another aspect of the invention is directed to making multiple sequence block polymers having repeating ternary block polymer units, such as —ABA—, where A and B are different polydiorganosilixane blocks, such as polydimethylsiloxane and polydiphenylsiloxane. In making the multiple sequence block polymers, a diorganocyclotrisiloxane such as shown by Formulas 1 or 3 is initially contacted with a silanolate-complex included by Formula 2, where Y is HMPA·MO—, to produce an active polydiorganosiloxane consisting of two polydiorganosiloxane blocks joined by a $$\left[\overset{R'}{\underset{R'}{Si}}O\right]_n$$

unit derived from the silanolate-complex. Upon contacting the active polydiorganosiloxane with different diorganocyclotrisiloxane, two additional active polydiorganosiloxane segments grow on either side of the starting active polydiorganosiloxane to produce an active ABA ternary structure. Upon contacting difunctional silane included by Formula 4 with active ternary block polymer which can be of the ABA type, or a mixture of different ternary block polymers derived from separate reaction vessels such as ABA, ACA, BAB, CAC, etc., where each block can be the same or different size, a multiple sequence ternary block polymer is produced as illustrated by the following equation, $$T(ABA)+T'(R_2'SiX_2)\longrightarrow\left[ABA\overset{R'}{\underset{R'}{Si}}\right]_t$$

where T, T' and $t$ are positive integers.

In accordance with the practice of the invention, multiple sequence block polymers can be made by initially forming a ternary block polymer having a central block and two end blocks. The ternary block polymer is then coupled to "form" a multiple sequence block polymer by "contact with" a difunctional silane or "coupler."

In making the central block, reaction is effected between diorganocyclotrisiloxane or "cyclic" and silanolate-complex or "initiator." The size of the central block $\overline{Dp_n}$, i.e., the number of diorganosiloxy units, can be calculated by the following formula, $$Dp_n=\frac{3x\text{ mole of cyclic}}{\text{Moles of initiator}}$$

For example, if the $Dp_n$ of 900 is desired in the central block, 1/300 moles of initiator can be employed. Reaction between the cyclic and initiator is conducted under an inert atmosphere at temperatures determined by the physical characteristics of the reactants. For example, a nitrogen atmosphere and room temperature will provide for optimum results. Temperatures between —50° to 250° C. also can be used in situations where the physical characteristics of the reactants will permit. Along with the aforementioned reactants and conditions, the production of the central block also will be facilitated by the employment of a suitable organic solvent and a sufficient degree of agitation. Suitable solvents will depend upon the nature of the cyclic employed, the block size of the central block desired, etc. For example, if the cyclic employed for the central block is hexamethylcyclotrisiloxane, solvents such as benzene, o-dichlorobenzene, anisole, diphenylether, etc., can be used for block size between 30 to 3,000 dimethylsiloxy units. Reaction time can vary widely depending upon the nature of the reactants, degree of agitation, block size desired, etc. In some instances, as little as 4 hours or less can be employed, while usually from 8 to 12 hours will be necessary.

The ternary block can be produced by merely adding a different cyclic to the central block reaction mixture. Depending upon the size of the end blocks desired, more or less of the cyclic can be added. To produce end blocks which are comparable in size to the central block, two moles of end block cyclic, per mole of central block are employed. Again the characteristics of the end block cyclic and length of the end block desired will govern the type of solvent employed in the mixture. For example, if end blocks having from 9 to 1,000 diphenylsiloxy units are desired, suitable solvents may be o-dichlorbenzene, toluene, anisole, diphenylether, etc. Reaction temperatures and reaction times again can vary widely in different situations.

Experience has shown that the coupling of the ternary block with the difunctional silane is most effectively achieved if difunctional silane is employed in an amount in the ternary block mixture to provide for substantially equivalent amounts of alkali metal of the ternary block and hydrolyzable radicals of the difunctional silane. If, from about 0.5 to about 1.5 equivalents of hydrolyzable radical, per equivalent of alkali metal are employed, effective results can be achieved.

When producing branched block polymers in accordance with the inveniton, an active polydiorganosiloxane is initially made having a terminal triorganosiloxy unit and a terminal alkali metal silanolate unit. A polyfunctional silane is then employed to produce a branched block polymer.

The active polydiorganosiloxane can be in the form of a binary block or higher. A silanolate-complex within the scope of Formula 2 having a triorganosiloxy chain (stopping unit can be employed. Equal molar amounts of initiator and cyclic are agitated under an inert atmosphere. The conditions utilized are similar to those described above for the production of the ternary block polymer. After the formation of an initial active triorganosiloxy terminated polydiorganosiloxane, a different cyclic can be added to the mixture to provide for the production of a binary block polymer. The sizes of the A and B block will be determined by the $\overline{Dp_n}$ formula shown above. If desired a ternary block can be produced which may be ABA, or ABC by adding a different cyclic to the binary block mixture.

The branched block polymer can be made with tri and tetrafunctional silane within the scope of Formula 4. If desired, monofunctional end capping or difunctional silane can be employed to produce AB–BA type block polymer structures. Again, coupling of the active triorganosiloxy terminated polydiorganosiloxane branches can be achieved most effectively when substantially equivalent amounts of alkali metal and hydrolyzable radicals of the coupler are employed in the mixture.

The multiple sequence block polymers of the present invention can be employed to make organopolysiloxane elastomers when converted to sheets, tubing, films, etc., and cured with conventional organic peroxides such as benzoylperoxide, tertiarybutylperbenzoate, bis(2,4-dichlorobenzoyl)peroxide, etc. High energy electron irradiation without curing agents also can be employed for vulcanizing purposes. The multiple sequence block polymers also can be reinforced with various reinforcing fillers such as fume silica in amounts equivalent to about from 10 to about 100 parts of filler per 100 parts of the polymer. In addition, along with the aforementioned reinforcing fillers extending fillers such as titanium oxide, calcium carbonate, diatomacious earth, etc., can be utilized either alone or in combination with the reinforcing fillers to provide for a total filler content of from 10 to 300 parts of filler per hundred parts of polymer.

The branched polymers produced in accordance with the present invention also can be employed in applications requiring the service of temperature-resistant high strength elastomers cured and reinforced as described above with respect to the multiple sequence block polymer.

In order that those skilled in the art will be better able to practice the invention, the following examples are given by way of illustration and not by way of limitation. All parts are by weight.

EXAMPLE 1

A solution of the hexamethylphosphoramide complex of dilithio-1,1,3,3-tetraphenyldisiloxanediolate containing 0.8187 part of the complex dissolved in 5 parts of benzene was added to a solution of 18.64 parts of hexamethylcyclotrisiloxane dissolved in 20 parts of benzene which was being stirred under an inert atmosphere. The resulting solution was stirred at room temperature (25° C.–30° C.) for 18 hours. Based on method of preparation there was obtained an active polydiorganosiloxane having terminal lithium dimethylsilanolatesiloxy units and consisting of two polydimethylsiloxane blocks of approximately 242 chemically combined dimethylsiloxy units joined on either side of a tetraphenyldisiloxane unit.

There was added to the above viscous solution while it was stirred, 11.88 parts of hexaphenylcyclotrisiloxane and 65 parts of o-dichlorobenzene while the resulting mixture was stirred. The temperature of the mixture was then raised to 150° C. and stirring was continued for 5 hours. The mixture was then allowed to cool to room temperature and the resulting viscous liquid set into a gelatin-like mass. Based on method of preparation, the product was a ternary polydiorganosiloxane block polymer having the above-described polydimethylsiloxane block and two end blocks of polydiphenylsiloxane having approximately 30 chemically combined diphenylsiloxy units. The polydiorganosiloxane ternary block also had terminal lithium diphenylsiloxy terminal units.

Diphenyldiacetoxysilane was then added to a portion of the above described ternary block polymer to produce a mixture containing approximately 0.23 equivalence of acetoxy radicals, per 0.437 equivalence of lithium of the lithium-terminated ternary block polymer. The mixture was heated at 100° C. for ½ hour. Additional diphenyldiacetoxysilane was added to produce a mixture having substantially equivalent amounts of acetoxy radical of the diphenyldiacetoxysilane and lithium of the ternary block polymer. The mixture was heated at 100° C. for 5 hours. A marked increase in solution viscosity was observed. The mixture was then added to methanol to effect precipitation of product. The product was dissolved in benzene and reprecipitated in methanol. The product was then washed in hot ethanol and dried at reduced pressure. Based on method of preparation, the product obtained by effecting reaction between diphenyldiacetoxysilane and the ternary block polymer was a multiple sequence ternary block polymer consisting essentially of chemically combined ternary block units of the average formula, $$\left[(Si(C_6H_5)_2O)_{30}-(Si(CH_3)_2O)_{121}-Si(C_6H_5)_2OSi(C_6H_5)_2-\right.$$
$$\left.[((C_6H_5)_2SiO)_{30}-(SiO(CH_3)_2)_{121}\right]$$

The intrinsic viscosity of the ternary block was 0.84 dl./g. in benzene at 25° C. and the intrinsic viscosity of the multiple sequence block polymer was 2.4 dl./g. in benzene at 25° C.

The above multiple sequence of polydiphenylsiloxane-polydimethylsiloxane block polymer is milled with fumed slica on a rubber mill to produce a mixture of 30 parts of fumed silica, per 100 parts of polymer. There is then milled two parts of benzoylperoxide into the mixture. A slab from the milled mixture is press-cured at a pressure of 5,000 p.s.i. for 15 minutes at a temperature of 160° C. The same procedure is repeated with the ternary block polymer and a slab cut from a milled sheet of the block polymer filler mixture is then press-cured by the same procedure. It is found that the cured slab of the multiple sequence block polymer has a tensile of 1,200 p.s.i. and an elongation of 600 percent as compared to a tensile of 600 p.s.i. and an elongation of 400 percent for the cured slab derived from ternary block polymer.

EXAMPLE 2

A ternary polydiphenylsiloxane - polydimethylsiloxane-polydiphenylsiloxane block polymer having terminal diphenyllithiosilanolate radicals was made in accordance with the method of Example 1. In addition, a ternary polydiphenylsiloxane - polydimethylsiloxane - polydiphenylsiloxane and polydimethylsiloxane substantially equivalent to the ternary block polymer of Example 1, but made in accordance with Example 3 of Bostick Pat. 3,337,497 assigned to the same assignee as the present invention. In making the ternary block polymer by Bostick's method, the dilithium siloxanolate of meso - 1,3 - dimethyl-1,3-diphenyldisiloxane-1,3-diol was employed in place of hexamethylphosphoramide-complex of dilithio - 1,1,3,3-tetraphenyldisiloxanediolate. In accordance with the present invention, mixtures were made of various difunctional silanes and the above ternary block polymers made in accordance with the present invention. Mixtures also were made with the same difunctional silanes and ternary block polymer made in accordance with the method of Bostick. All of the mixtures employed had substantially equivalent amounts of the hydrolyzable radical of the silane, and lithium of the ternary block polymer. The initial intrinsic viscosities of the ternary block polymer made in accordance with Example 1 of the present invention, in benzene at 25° C., "dl./g." and in accordance with Example 3 of the aforementioned Bostick patent were both approximately 0.84 dl./g. in benzene at 25° C. The following table shows the results obtained in terms of increase in intrinsic viscosity "Multiple Sequence" with certain difunctional silanes "Coupler" with the "Ternary" block polymer made in accordance with the method of "Bostick" and the silanolate-complex:

| | Ternary (dl./g.) | + Coupler | = Multiple sequence (dl./g.) |
|---|---|---|---|
| Silanolate-complex | 0.84 | $(C_6H_5)_2Si(O\overset{O}{\overset{\|}{C}}CH_3)_2$ | 2.75 |
| | | $(CH_3)_2Si(O\overset{O}{\overset{\|}{C}}CH_3)_2$ | 2.12 |
| Bostick | 0.84 | $(C_6H_5)_2Si(O\overset{O}{\overset{\|}{C}}CH_3)_2$ | 0.84 |
| | | $(CH_3)_2Si(O\overset{O}{\overset{\|}{C}}CH_3)_2$ | 0.84 |

The above table shows that the ternary block polymer made by Bostick's method did not increase in intrinsic viscosity when mixed with the coupler while the ternary block polymer made in accordance with the practice of the invention using the silanolate-complex increased in viscosity. Those skilled in the art would know that an increase in viscosity indicates the production of a multiple sequence block polymer.

EXAMPLE 3

There was added a solution of 0.680 part of hexamethylphosphoramidolithiumtriphenylsilanolate in 10 parts of toluene to a solution while it was being stirred under an inert atmosphere of 170 parts of hexamethylcyclotrisiloxane in 170 parts of toluene. The mixture was stirred at room temperature for 18 hours. Based on method of preparation, there was obtained a polydimethylsiloxane having a terminal triphenylsiloxy unit which consisted of about 1,580 chemically combined dimethylsiloxy units and which also had a terminal dimethyllithiosilanolate unit.

To the above active polydimethylsiloxane there was added 30 parts of hexaphenylcyclotrisiloxane and 30 parts of toluene while the resulting mixtures was stirred. The temperature of the mixture was gradually raised over a period of two hours to 150° C., and maintained at temperature for 5 hours while the mixture was continuously stirred. The mixture was then allowed to cool to room temperature. Based on method of preparation, the product was a binary block polymer consisting of a polydimethylsiloxane block having a terminal triphenylsiloxy unit joined to a polydiphenylsiloxane consisting of about 104 chemically combined diphenylsiloxy units and having a terminal diphenyllithiosilanolate unit.

Portions of the above binary polydimethylsiloxane-polydiphenylsiloxane block polymer were mixed with various polyfunctional silanes to make branched block polymers. As shown in the following table, the intrinsic viscosities at 120° C. in o-dichlorobenzene of the resulting branched polymers increased over the intrinsic viscosity of the original binary block. The branched polymers did not vary significantly even though a difunctional, trifunctional and a tetrafunctional silane were employed.

| Binary (dl./g.) | Coupler | Branched (dl./g.) |
|---|---|---|
| 0.40 | | |
| | Dimethyldiacetoxy | 0.61 |
| | Methyltriacetoxy | 0.60 |
| | Tetraacetoxy | 0.65 |

The above result is in accord with the "Number of Arms" radiation from a single point theory in P. Meares, Polymers; Structure and Bulk Properties, page 78, D. Van Nostrand, Princeton (1965).

The above branched polymers are milled respectively with fume silica and tert-butylperbenzoate to produce blends having 100 parts of polymer, 25 parts of filler and 2 parts of peroxide. Slabs made from the respective milled mixture are press-cured at 5,000 p.s.i. for 15 minutes at 160° C. The cured slabs are found to have valuable elastomeric properties.

EXAMPLE 4

Several ternary blocks having a central block consisting essentially of polydimethylsiloxane joined by a tetraphenyldisiloxane unit and end blocks attached to the central block consisting essentially of various amounts of chemically combined diphenylsiloxy units and methylphenylsiloxy units were prepared in accordance with the procedure of Example 1.

The central block of the various ternary blocks consisted essentially of about 500 chemically combined dimethylsiloxy units. The central block was made by effecting reaction between hexamethylcyclotrisiloxane and dilithio-1,1,3,3-tetraphenyldisiloxanediolate complexed with hexamethylphosphoramide. The end blocks of the aforementioned ternary blocks consisted essentially of chemically combined diphenylsiloxy units and methylphenylsiloxy units. The end blocks of ternary block (I) consisted of about 64 chemically combined diphenylsiloxy units and terminated with about 18 methylphenylsiloxy units. Ternary block (II) consisted of the same central block and two end blocks consisting of about 164 chemically combined diphenylsiloxy units and about 18 terminal methylphenylsiloxy units. Ternary block (III) having the same central block consisted of two end blocks composed of about 253 chemically combined diphenylsiloxy units and terminated with 18 methylphenylsiloxy units.

The various ternary blocks were made by adding different amounts of hexaphenylcyclotrisiloxane to a reaction mixture under a nitrogen atmosphere of the above described polydimethylsiloxane having terminal lithiohexamethylphosphoramide radicals. The hexaphenylcyclotrisiloxane was reacted with the active central block at a temperature of about 110° C. for about three hours. There was then added to the respective ternary block mixtures the same amount of the 2,4,6-trimethyl-2,4,6-triphenylcyclotrisiloxane. The resulting mixture was then stirred at 110° C. for two hours. Depending upon the amount of the hexaphenylcyclotrisiloxane employed in the production of the ternary block polymer, various amounts of orthodichlorobenzene were utilized to produce a solution of the respective ternary blocks.

The above-described ternary block solutions were then mixed together in various amounts to produce ternary block mixtures A, B, C. Mixture A consisted of 12.7 parts of I, per 22.6 parts of ternary II. Mixture B consisted of 11.0 parts of ternary I, per 27.1 parts of ternary III, while mixture C consisted of 15.8 parts of ternary II, per 27.2 parts of ternary III.

Portions of mixtures A, B and C were then separately mixed with diphenyldiacetoxysilane dissolved in toluene. The diphenyldiacetoxysilane was added to each mixture in two equal increments which were at a 15 minute interval. The moles of diphenyldiacetoxysilane employed were substantially equivalent to the molar equivalents of lithium present in the respective mixtures. After the mixtures were allowed to cool to room temperature, products were precipitated from each of the mixtures by pouring them separately into excess methanol. Based on method of preparation, the respective products were multiple sequence ternary block polymers having different ternary blocks. The intrinsic viscosity in orthodichlorobenzene at 120° C. of each of the multiple sequence ternary block polymers were found to be greater than the intrinsic viscosities of the respective ternary block polymers in orthodichlorobenzene at 120° C.

Filled slabs of the various mixed multiple sequence ternary block polymers made from the above A, B, and C mixtures above are press-cured in accordance with a procedure described in Example 1. It is found that when the slabs made from the mixed multiple sequence block polymers are compared to comparable filled slabs made from the source ternary block polymers that the mixed multiple sequence block polymers form elastomers substantially superior in physical properties to the elastomers made from the ternary block polymers. The uncured filled mixtures also are found to be extrudable and valuable for making temperature resistant insulation for metallic conductors.

Although the above examples illustrate only a few of the very many multiple sequence block polymers and branch block polymers which can be made in accordance with the practice of the invention, it should be understood that the present invention is directed to a much broader class of multiple sequence block polymers which can be made by utilizing cyclodiorganotrisiloxane of Formulas 1 and 3 in combination with silanolate-complex in the scope of Formula 2 and silane within the scope of Formula 4.

What we claim as new and desire to secure by Letters Patent of the United States is:

1. A method which comprises (1) effecting reaction between a cyclodiorganotrisiloxane of the formula,

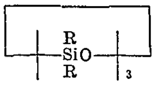

and a complex silanolate of the formula, $$Y\!-\!\left[\begin{array}{c}R'\\ SiO\\ R'\end{array}\right]_n\!-\!M\cdot HMPA$$

where Y is selected from R′ and HMPA·MO—, (2) effecting reaction between the reaction product of (1), and a different cyclodiorganotrisiloxane of the formula,

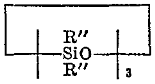

to produce active polydiorganosiloxane having at least one alkali metal silanolate-radical and (3) effecting reaction between the active polydiorganosiloxane of (2) and a silane of the formula, $$(R''')_aSiX_{4-a}$$

where R and R″ are selected from the class consisting of monovalent hydrocarbon radicals, halogenated monovalent hydrocarbon radicals and cyanoalkyl radicals, R′ is selected from monovalent hydrocarbon radicals and halogenated monovalent aryl radicals, R‴ is a member selected from hydrogen, monovalent hydrocarbon radicals, halogenated monovalent hydrocarbon radicals, cyanoalkyl radicals, N,N-dialkylamino-alkyl radicals, N,N-diarylaminoalkyl radicals and alkoxyalkyl radicals, M is an alkali metal radical, X is a hydrolyzable radical, OM·HMPA is an alkali metal-hexamethylphosphoramide radical, *n* is an integer equal to 1 to 4 inclusive, and "*a*" is a whole number equal to 0 to 2 inclusive.

2. A method for making multiple sequence block polymers by coupling ternary block polymers in accordance with claim 1, utilizing a silanolate-complex of the formula, $$HMPA\cdot MO\!-\!\left[\begin{array}{c}R'\\ SiO\\ R'\end{array}\right]_n\!-\!M\cdot HMPA$$

and a difunctional silane of the formula, $$(R''')_2SiX_2$$

where M is lithium, *n*=2 and R′, R‴ and X are as previously defined.

3. A method in accordance with claim 1, utilizing a silanolate-complex of the formula, $$R'\!-\!\left[\begin{array}{c}R'\\ SiO\\ R'\end{array}\right]_n\!-\!M\cdot HMPA$$

where M is lithium, *n*=1 and R′ is as previously defined.

4. A method in accordance with claim 2, employing a mixture of different ternary block polymers.

5. A method in accordance with claim 1, which comprises (1) effecting reaction between hexamethylcyclotrisiloxane and a complex of hexamethylphosphoramide and dilithio - 1,1,3,3, - tetraphenyldisiloxanediolate, (2) effecting reaction between the reaction product of (1) and hexaphenylcyclotrisiloxane to produce a ternary polydiphenylsiloxane - polydimethylsiloxane - polydiphenylsiloxane block polymer, and (3) effecting reaction between the product of (2) and diphenyldiacetoxysilane.

References Cited

UNITED STATES PATENTS

| | | | |
|---|---|---|---|
| 3,328,323 | 6/1967 | Vaughn | 260—825X |
| 3,337,497 | 8/1967 | Bostick | 260—46.5 |
| 3,378,521 | 4/1968 | Bostick | 260—46.5 |
| 3,462,386 | 8/1969 | Goosens | 260—825X |
| 3,481,965 | 12/1969 | Selin | 260—46.5X |
| 3,483,270 | 12/1969 | Bostick | 260—46.5X |

MURRAY TILLMAN, Primary Examiner

H. ROBERTS, Assistant Examiner

U.S. Cl. X.R.

260—37, 53, 46.5R, 448.2RE, 448.8R